United States Patent [19]

Anderson

[11] Patent Number: 4,576,776

[45] Date of Patent: Mar. 18, 1986

[54] FLOW FORMING OF COMPOSITE MATERIAL

[75] Inventor: Marlow C. Anderson, Kent, Wash.

[73] Assignee: Boeing Commercial Airplane Company, Seattle, Wash.

[21] Appl. No.: 639,846

[22] Filed: Aug. 13, 1984

[51] Int. Cl.⁴ .............................................. B29C 43/10
[52] U.S. Cl. .................................. 264/510; 264/546;
264/552; 264/310; 264/314; 264/316;
264/297.5; 425/389
[58] Field of Search ............... 264/510, 512, 546, 310,
264/314, 316, 297.5, 552; 425/389

[56] References Cited

U.S. PATENT DOCUMENTS

| | | | |
|---|---|---|---|
| 2,838,435 | 6/1958 | Hewett | 154/110 |
| 2,838,796 | 6/1958 | Reed | 18/19 |
| 2,937,401 | 5/1960 | Amos | 18/5 |
| 2,975,476 | 3/1961 | Burke | 18/17 |
| 3,128,322 | 4/1964 | Young | 264/314 |
| 3,316,337 | 4/1967 | North | 264/231 |
| 3,546,740 | 12/1970 | Johnson | 18/19 |
| 3,614,811 | 10/1971 | Johnson | 18/19 |
| 3,642,975 | 2/1972 | Duggins | 264/314 |
| 3,847,631 | 11/1974 | MacMillan | 156/96 |
| 3,871,941 | 3/1975 | Wasko | 156/394 |
| 3,937,781 | 2/1976 | Allen | 264/314 |
| 4,017,572 | 4/1977 | Magone et al. | 264/51 |
| 4,027,543 | 6/1977 | Johnston | 74/231 R |
| 4,032,610 | 6/1977 | Spiller et al. | 264/107 |
| 4,148,597 | 4/1979 | Larsen | 425/389 |
| 4,311,661 | 1/1982 | Palmer | 264/510 |
| 4,353,855 | 10/1982 | Garabedian | 264/126 |

FOREIGN PATENT DOCUMENTS

| | | | |
|---|---|---|---|
| 68696 | 5/1915 | Austria | 264/316 |
| 2065022 | 6/1981 | United Kingdom | 264/314 |

OTHER PUBLICATIONS

"McDonnell Douglas Cuts Aircraft Construction Time", from Aviation Week & Space Technology, Jan. 9, 1984, p. 71.

*Primary Examiner*—Jan Silbaugh
*Attorney, Agent, or Firm*—Joan H. Pauly

[57] ABSTRACT

This invention relates to methods and apparatus for forming composite material components that have relatively complex surfaces. Currently such components are very expensive to manufacture because forming them requires a good deal of time and hand working of the material. In the system of the invention, a flexible membrane (38) is heated to a forming temperature. Composite material (70) is laid on membrane (38) and heated evenly by contact with membrane (38). Fluid pressure is applied to membrane (38) to force membrane (38) and material (70) upwardly against a mold surface. While it is urged against the mold surface, material (70) flow forms to the shape of the mold surface. Preferably, the mold surface and membrane (38) are rotated about a horizontal axis approximately 180° to position the mold surface below membrane (38) before the fluid pressure is removed to allow membrane (38) to move out of contact with material (70).

7 Claims, 8 Drawing Figures

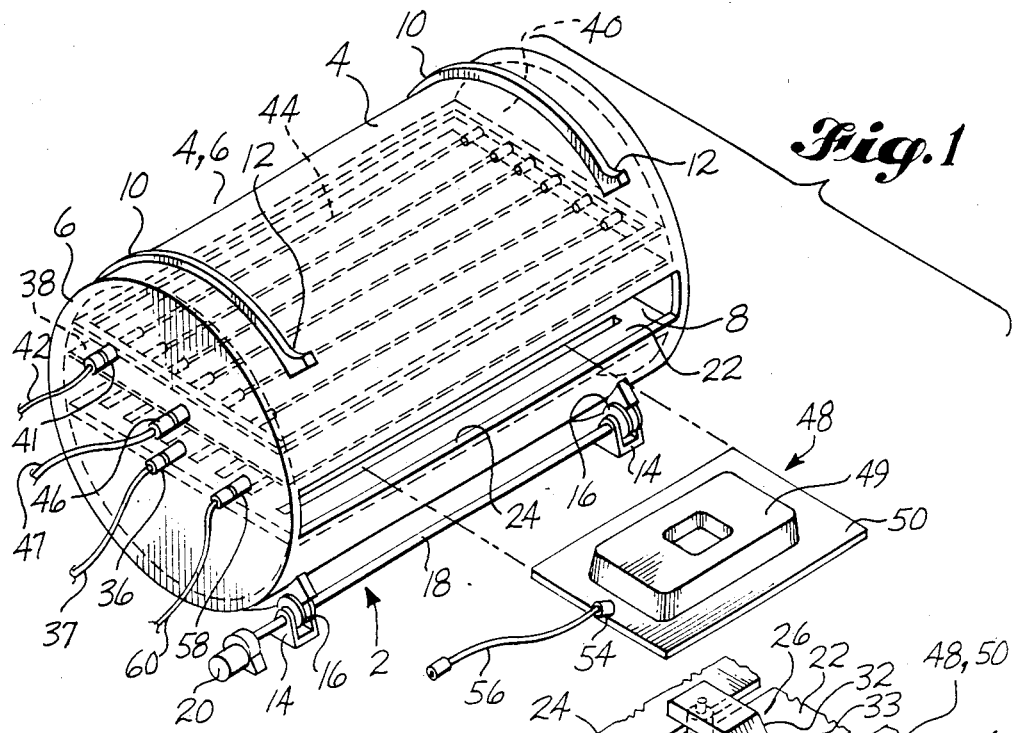
*Fig.1*
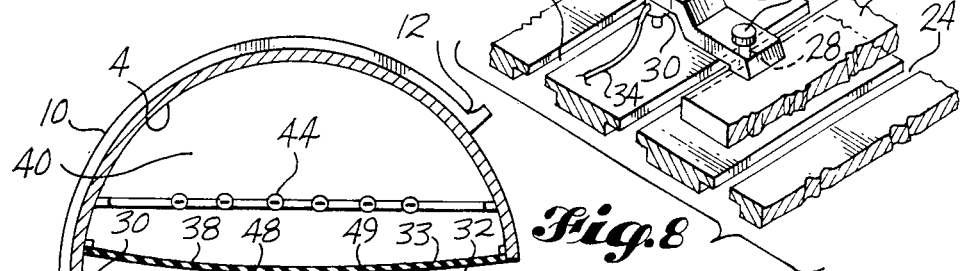
*Fig.8*
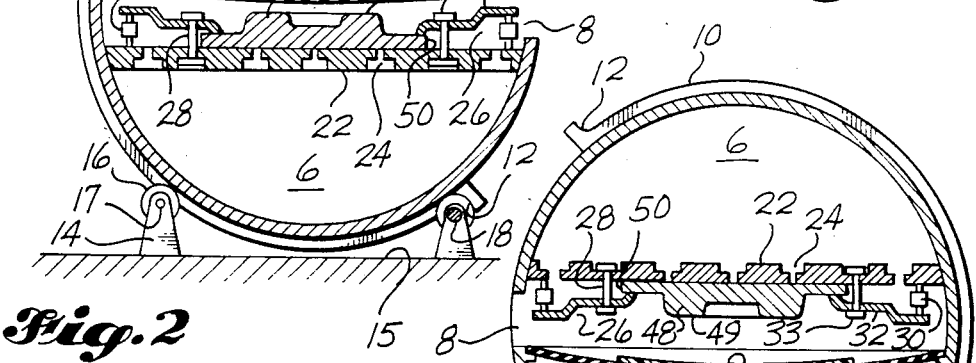
*Fig.2*
*Fig.4*

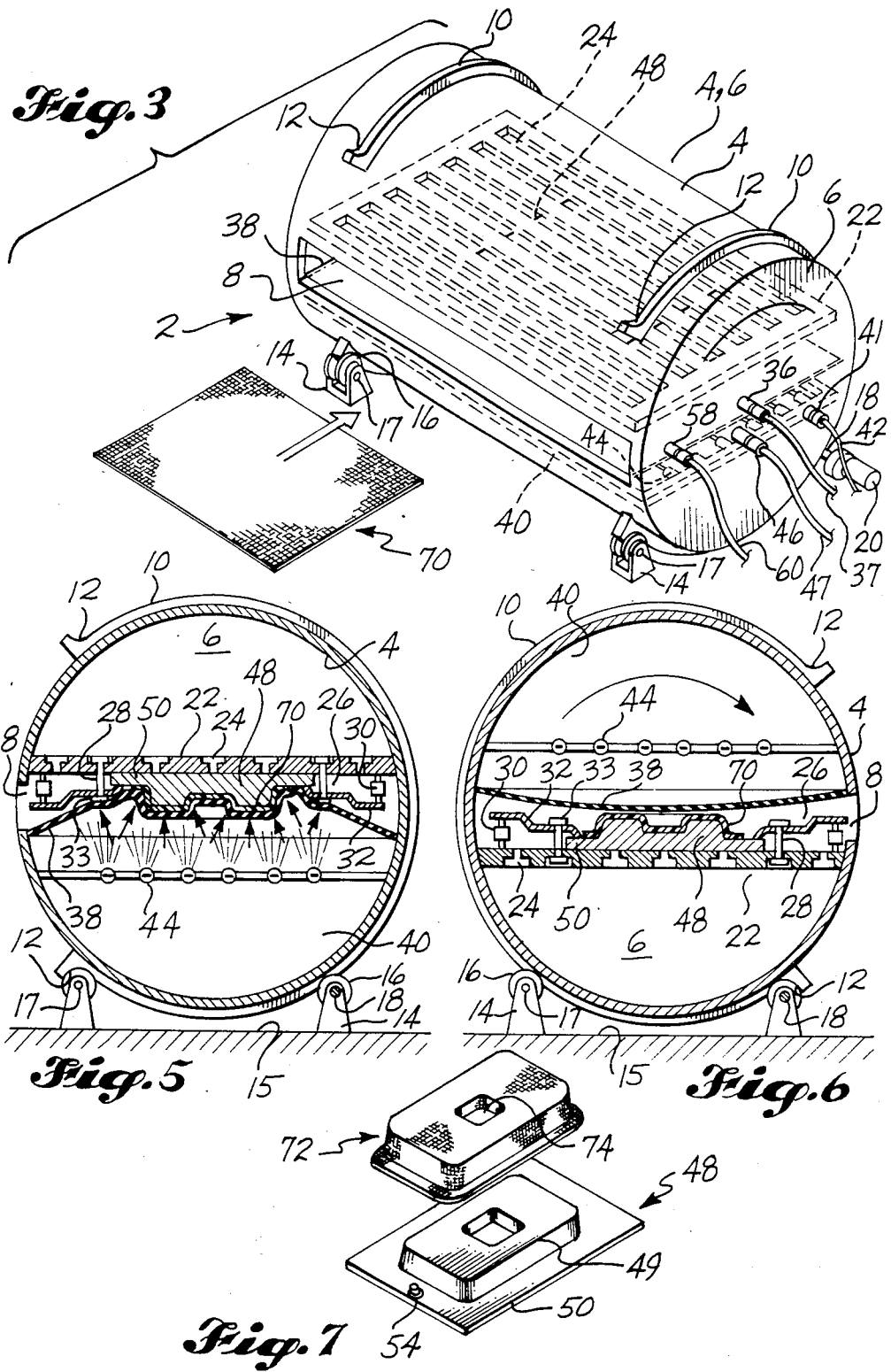

FLOW FORMING OF COMPOSITE MATERIAL

DESCRIPTION

1. Technical Field

This invention relates to methods and apparatus for forming composite material and, more particularly, to such a method and apparatus in which the composite material is heated evenly by contact with a membrane and takes the shape of a mold by flow forming when fluid pressure is applied to the membrane to urge the material against the mold.

2. Background Art

The use of composite materials in the manufacture of aircraft is become increasingly widespread. Such materials in general offer a very high strength-to-weight ratio and, thus, can provide significant savings in the overall weight of the aircraft. However, the cost of manufacturing composite material components is generally greater than the cost of manufacturing conventional sheet metal components. This is especially true of small parts with relatively complex surfaces. The cost of manufacturing such parts from composite materials using known methods can be as much as ten times the cost of producing sheet metal parts. Such high manufacture costs make the composite material components prohibitively expensive. The high cost is primarily a result of the fact that a good portion of the fabrication of the parts must be accomplished by hand. The uncured composite material is positioned over a mold or mandrel and is hand worked to form it to the shape of the mold. Nylon scrapers are used to mold the material and heat is applied from a heat gun as needed to form the material. This labor intensive process is very time consuming and expensive.

Each of the following United States patents discloses a method and/or apparatus for forming plastic or composite material by using fluid pressure to expand a flexible membrane or bag and thereby urge the material against a mold surface: U.S. Pat. No. 2,838,435, granted June 10, 1958, to O. C. Hewett; U.S. Pat. No. 2,937,401, granted May 24, 1960, to H. Amos; U.S. Pat. No. 2,975,476, granted Mar. 21, 1961, to J. E. Burke; U.S. Pat. No. 3,546,740, granted Dec. 15, 1970, to H. G. Johnson; U.S. Pat. No. 3,614,811, granted Oct. 26, 1971, to H. G. Johnson; U.S. Pat. No. 3,642,975, granted Feb. 15, 1972, to R. B. Duggins et al; U.S. Pat. No. 3,937,781, granted Feb. 10, 1976, to P. E. Allen; U.S. Pat. No. 4,017,572, granted Apr. 12, 1977, to R. L. Magone et al; U.S. Pat. No. 4,032,610, granted June 28, 1977, to B. H. R. Spiller et al; U.S. Pat. No. 4,148,597, granted Apr. 10, 1979, to G. E. Larsen; and U.S. Pat. No. 4,353,855, granted Oct. 12, 1982, to A. Garabedian.

Hewett and Duggins et al each disclose a process in which plastic in a liquid form is applied to a flexible membrane which is then expanded against a mold surface. Johnson U.S. Pat. No. 3,546,740 discloses apparatus in which a sheet of plastic is placed on a strong elastomeric pressure diaphragm which is then moved upwardly by fluid pressure against a die surface. The remainder of the above-cited patents disclose methods and/or apparatus in which the material to be formed is applied to a mold surface.

In the Burke apparatus, thermoplastic sheet material is placed between a flexible bag and a mold surface, and a vacuum is applied to the space between the sheet material and the mold surface. Heat and pressure are then applied to the sheet material via fluid pressure introduced into the bag. In the Spiller et al method, pressure is exerted on a flexible matrix to press it against a sheet of thermoplastic material by fluid pressure acting on a flexible diaphragm adjacent to the matrix opposite the sheet material. Then the pressure is increased and the temperature of the fluid acting on the diaphragm is raised to mold the sheet material. In the Garabedian process, pressure is applied to plastic particles, and then heat is applied to the particles under pressure to consolidate the particles. Hewett discloses a method in which liquid plastic is applied to an inflatable bag which is then expanded against a female mold surface to form a hollow plastic part. Hewett states that heat may be applied for curing the plastic either through the expanding fluid in the bag or through the mold. In the Johnson U.S. Pat. No. 3,546,740 apparatus mentioned above, heating elements are provided in the rigid die against which the strong diaphragm and sheet material are urged by fluid pressure.

R. E. Young discloses a method of molding material made from a fibrous material impregnated with a resin binder in U.S. Pat. No. 3,128,322, granted Apr. 7, 1964. In the Young method, the material to be formed is placed onto a rounded mandrel, and an inflated bag is lowered over the mandrel. The action of the bag moving down over the mandrel squeezes air and excess resin binder out of the material. The mandrel is provided with heating elements to cure the material.

U.S. Pat. No. 3,316,337, granted Apr. 25, 1967, to C. J. North, discloses a process for making glass fiber reinforced filament-wound hollow elements. Filaments of glass are wound around an expandable mandrel. During the winding process, the mandrel is expanded, by mechanical means or through a flexible membrane on the mandrel surface, to pretension the filaments.

Systems for pressure curing materials are disclosed in U.S. Pat. No. 2,838,796, granted June 17, 1958, to D. J. Reed; U.S. Pat. No. 3,847,631, granted Nov. 12, 1974, to K. T. MacMillan; U.S. Pat. No. 3,871,941, granted Mar. 18, 1975, to E. J. Wasko; and U.S. Pat. No. 4,027,543, granted June 7, 1977, to J. A. Johnston. In each of these four patents, heat and pressure are applied to the material to be cured by the introduction of pressurized fluid that acts on the material through a flexible membrane or membranes.

The use of a vacuum press in the manufacture of composite material aircraft components is briefly discussed in an article in the Jan. 9, 1984 issue of the magazine Aviation Week & Space Technology by Alton K. Marsh, entitled "McDonnell Douglas Cuts Aircraft Construction Time". The vacuum form press is lowered down over flat layers of carbon-epoxy composite material that have been positioned over airplane part tools. The press forces the parts to adhere together by using the epoxy embedded in the carbon fiber material. The article also mentions vacuum form boxes that are covered with sheets of rubber to create a vacuum seal and are used in the manufacture of small parts.

The above patents and other literature and the prior art that is discussed and/or cited therein should be studied for the purpose of putting the present invention into proper perspective relative to the prior art.

DISCLOSURE OF THE INVENTION

A subject of the present invention is a method of forming into a desired shape composite material that includes a matrix material reinforced with a fibrous material. According to an aspect of the invention, the method comprises positioning a mold surface generally above and facing a flexible membrane. The membrane is heated to a forming temperature at which the matrix material will flow into the desired shape and which is below the critical cure temperature of the matrix material. The composite material is laid on the membrane, and the matrix material is allowed to be heated evenly by contact with the membrane. Fluid pressure is applied to the heated membrane opposite the mold surface to force the membrane and the material thereon upwardly against the mold surface. While the fluid pressure is maintained, the matrix material is allowed to flow and the composite material is allowed to take the desired shape. Then, the fluid pressure is removed from the membrane to allow the membrane to move out of contact with the composite material. Preferably, while the fluid pressure is being maintained, the mold surface and membrane are rotated about a horizontal axis about 180°.

According to a preferred aspect of the invention, after the matrix material is allowed to flow and before the fluid pressure is removed, a vacuum is applied between the composite material and the mold surface to ensure that the composite material is completely formed. According to another preferred aspect of the invention, after the membrane is allowed to move out of contact, the mold surface and the composite material formed thereon are moved away from the membrane and into an autoclave, and the composite material is cured in the autoclave.

In the preferred embodiment of the method of the invention, the mold surface and membrane are rotated about a horizontal axis about 180° while the fluid pressure is being maintained. The preferred embodiment also includes a number of steps that are carried out after the membrane is allowed to move out of contact with the composite material. These steps are as follows. The mold surface and the composite material formed thereon are moved away from the membrane, and a second mold surface is positioned generally below and facing the membrane. The second mold surface and the membrane are rotated about the horizontal axis about 180° to position the second mold surface generally above and facing the membrane. Unformed composite material is laid on the membrane and is allowed to be heated evenly by contact with the membrane. The steps of applying, maintaining, and then removing fluid pressure are repeated to form said unformed composite material. In this embodiment of the invention, the membrane is preferably maintained essentially at the forming temperature following the heating of the membrane to such forming temperature. This temperature is maintained at least through the step of repeating the steps of applying and maintaining a fluid pressure. In this embodiment, it is also generally preferable, after moving the first mold surface and the composite material formed thereon away from the membrane, to place said first mold surface and composite material formed thereon inside an autoclave and to cure such composite material formed thereon in the autoclave.

Another subject of the invention is apparatus for forming composite material into a desired shape. According to an aspect of the invention, the apparatus comprises a body having a horizontal axis and including inner wall portions. A flexible membrane is attached to such wall portions to form therewith a closed chamber. The membrane is generally parallel to the horizontal axis. Means is provided for removably securing a mold having a molding surface with the desired shape to such inner wall portions, in a position in which the molding surface is spaced from the membrane and chamber and faces the membrane. Means is also provided for heating the membrane to in turn heat any composite material positioned thereon and for introducing fluid pressure into the chamber to expand the membrane upwardly toward the molding surface and urge the material against the molding surface, to form the material. The body is mounted for rotation about it's horizontal axis, with the membrane expanded and the material urged against the molding surface, from a first position in which the membrane is generally below the molding surface to a second position in which the membrane is generally above the molding surface, and for rotation back to the first position following a reduction in the fluid pressure and removal of the material from the body.

A preferred feature of the apparatus of the invention is the inclusion of means for applying a vacuum between the material and the molding surface when the membrane has been expanded to urge the material against the molding surface. Another preferred feature is a body that includes an essentially cylindrical sidewall having a longitudinal axis coinciding with said horizontal axis. Still another preferred feature is means for heating comprising heating elements located inside the chamber.

The means for removably securing a mold may be provided in a number of forms. In the preferred form, such means includes releasable fastening means carried by the inner wall portions of the body. A slot extends through and horizontally along such inner wall portions between the membrane and the fastening means to permit introduction and removal of the mold into and from the body. Preferably, the body includes an essentially cylindrical sidewall having a longitudinal axis coinciding with said horizontal axis, said inner wall portions include inner surface portions of the cylindrical sidewall and a chord wall inside such sidewall and substantially parallel to the membrane, and the fastening means is carried by the chord wall.

The method and apparatus of the invention provide accurate and efficient forming of composite material to in turn allow accurate forming of composite material aircraft components in a relatively quick, easy, and inexpensive manner. The placing of the composite material to be formed on a membrane and the heating of the material through contact with the membrane ensures that the material is heated evenly and permits an accurate control of the heating of the material that is not possible in hand operations using a heat gun. The even heating of the material and the forming of the material between an upper mold surface and the heated membrane help prevent the wrinkling of the composite material during the forming process. The material is formed accurately and efficiently, and there is no need for the costly and time consuming hand working of the material that is currently in use to form components with relatively complicated surfaces.

In embodiments of the invention in which the mold surface and membrane are rotated before removing the fluid pressure from the membrane, the efficiency and versatility of the method and apparatus are further increased. The rotation allows quick removal of the fluid pressure without risking distortion of the still heated composite material by gravity. It also places the mold surface and formed composite material in a position for relatively easy removal from the forming apparatus and facilitates introduction of a new mold into the apparatus.

The preferred embodiments of the method and apparatus of the invention provide for quick and easy removal of the mold surface and material formed thereon as soon as the forming process is completed. This makes it possible to immediately mold another component, with the same or different shape. As each part is formed, it is removed to make room for another part. This procedure creates maximum efficiency in the use of the apparatus. The forming process is relatively short compared to the curing process for most composites used in aircraft components. The apparatus of the invention may be used to sequentially form a number of components. Upon removal from the apparatus, each component may be placed in a large autoclave. The large autoclave may then be used to cure a fairly large number of components simultaneously. This overall procedure provides for a maximized efficiency and cost effectiveness in the fabrication of the components.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of the preferred embodiment of the apparatus of the invention and a mold in position to be received into the apparatus.

FIG. 2 is a vertical sectional view of the apparatus shown in FIG. 1 with the mold positioned inside the apparatus.

FIG. 3 is like FIG. 1 except that it shows the cylinder of the apparatus rotated 180°, the mold in position in the cylinder, and composite material in position to be placed in the apparatus on the membrane.

FIG. 4 is a vertical sectional view of the apparatus shown in FIG. 3 with the composite material in position on the membrane.

FIG. 5 is like FIG. 4 except that the membrane is shown expanded to form the material around the mold.

FIG. 6 is like FIG. 5 except that it shows the apparatus following rotation of the cylinder 180° and removal of the fluid pressure on the membrane.

FIG. 7 is an exploded pictorial view of a representative mold and finished (except for trimming) composite material component.

FIG. 8 is a fragmentary pictorial view showing the finger clamp of the preferred embodiment securing a mold in position on the chord wall.

BEST MODE FOR CARRYING OUT THE INVENTION

The drawings show apparatus 2 that is constructed according to the invention and that also constitutes the best mode of the apparatus of the invention currently known to the applicant. The drawings also illustrate the best mode of carrying out the method of the invention currently known to the applicant.

In the drawings, the process of forming composite material 70 into an article 72 is illustrated. The particular shape of the article 72 shown in the drawings has been chosen to illustrate the type of surface which may be advantageously formed using the method and apparatus of the invention. The article 72 includes a center recessed area 74 and rounded peripheral edges. Such details of configuration require a good deal of time and labor to form by conventional methods, but are formed relatively quickly and easily by use of the method and apparatus of the invention. It is of course to be understood that the method and apparatus of the invention may be used to advantage to form a wide variety of articles having a wide variety of configurations. The article 72 shown in the drawings is but one example of such an article.

The invention is directed primarily toward the forming of composite materials that include a matrix material reinforced with a fibrous material. Examples of such composite materials include graphite reinforced epoxies and materials reinforced with aramid fibers, such as the aramid fiber sold under the trademark Kevlar. Whatever the components of the material, the material formed may comprise a single ply or a number of plies and may even include a honeycomb core in a single or multiple core bay configuration. Each ply of the material may include fibers in a single orientation, fibers in multiple orientations, or fibers in various woven or knitted configurations. When a number of plies are to be formed in a single forming operation, the material may be preplied by any of a number of known means before being introduced into the apparatus 2 of the invention for forming.

The apparatus 2 of the preferred embodiment shown in the drawings includes a cylindrical body 4, 6 formed by a horizontally oriented cylindrical sidewall 4 and two opposite end walls 6. The body 4, 6 has a horizontal axis (the longitudinal axis of the cylindrical sidewall 4) about which the body 4, 6 is rotatable, as described below. The space inside the cylindrical sidewall 4 and end walls 6 is enclosed except for couplings for air, electrical, and vacuum lines and a slot 8. The slot 8 extends radially through and horizontally along the cylindrical sidewall 4. In the preferred embodiment shown in the drawings, the slot 8 extends substantially along the full horizontal length of the body 4, 6. This slot configuration is preferred for most installations. However, in installations in which a relatively long body 4, 6 is to be used to form composite material into relatively small shapes, it may be desirable to provide two or more slots along the body 4, 6 separated by circumferential walls.

The body 4, 6 of the preferred embodiment is mounted for rotation about its horizontal axis. The means for mounting the body 4, 6 includes a pair of longitudinally spaced rails 10, each of which extends circumferentially about three-fourths of the way around the outer surface of the cylindrical sidewall 4. The mounting means also includes two pairs of mounting lugs 14, one pair corresponding to each rail 10, which project upwardly from a fixed support 15, such as the floor of the installation. The two lugs 14 of each pair are spaced apart radially. The upper end of each lug 14 is bifurcated with two upwardly projecting arms between which a rotatable friction wheel 16 is received. Each friction wheel 16 has a center channel portion and two opposite rim portions. Each rail 10 is engaged in the channel portions of the corresponding friction wheels 16, with the rims of the wheels 16 serving to prevent longitudinal movement of the rail 10 with respect to the lugs 14 and wheels 16. Each of the two ends of each rail 10 is provided with a radially extending stop surface 12 to limit the amount of rotational movement of the body 4, 6 and define the two use positions of the body 4, 6 (FIGS. 1, 2, and 6 and FIGS. 3-5, respectively).

In the embodiment shown in the drawings, one friction wheel 16 of each pair is mounted on a drive shaft 18 that extends parallel to the horizontal axis of the body 4, 6. The shaft is rotated by an electric motor 20 to in turn rotate the friction wheels 16. The other wheel 16 of each pair is mounted on a pin 17 carried by the corresponding lug 14 and is free to rotate with respect to the lug 14. When the drive shaft 18 is rotated by motor 20, the wheels 16 frictionally engage the rails 10 and cause the body 4, 6 to rotate about its horizontal axis. In most installations, the weight of the body 4, 6 is sufficient to provide slippage free frictional engagement between the rails 10 and wheels 16 as the wheels 16 rotate the body 4, 6. Therefore, the preferred embodiment of the mounting and rotating means is reliable and accurate as well as relatively simple and inexpensive to manufacture and to operate.

The apparatus 2 also includes a flexible membrane 38 that is attached to inner surface portions of the cylindrical sidewall 4 and the end walls 6. As shown in FIG. 2, the cross section of the membrane 38 is generally in the form of a chord line with respect to the circular cross section of the cylindrical sidewall 4. The membrane 38 is generally parallel to the axis of the cylindrical body 4, 6 and is spaced from such axis. The membrane 38 forms, with inner surface portions of the cylindrical sidewall 4 and end walls 6, a closed chamber 40. The chamber 40 in its unexpanded configuration shown in FIG. 2 has a volume that is less than half the volume of the cylindrical body 4, 6. One side edge of the membrane 38 is attached to the inner surface of the cylindrical sidewall 4 adjacent to one edge of the horizontally extending slot 8. This arrangement provides convenient access for placing composite material to be formed onto the membrane 38.

The inner wall portions of the body 4, 6 include, in addition to the inner surfaces of the cylindrical sidewall 4 and end walls 6, a chord wall 22. The chord wall 22 is positioned inside the cylindrical sidewall 4 and is substantially parallel to the membrane 38. As shown in the drawings, the membrane 38 and chord wall 22 are spaced apart and are each about the same distance from the horizontal axis of the body 4, 6. The slot 8 is generally between the membrane 38 and chord wall 22 and is in open communication with the interior of the cylindrical sidewall 4 between the membrane 38 and the chord wall 22.

The apparatus 2 of the preferred embodiment shown in the drawings is designed to receive a large variety of different molds in order to form a corresponding variety of different aircraft components or other articles. Therefore, the apparatus 2 has means for removably securing a mold to the inner wall portions of the body 4, 6. In the preferred embodiment, the mold 48 is fastened to the chord wall 22 in a position in which the molding surface 49 of the mold 48 (the surface with the shape into which it is desired to form the composite material) faces the membrane 38 and is spaced from the membrane 38 and the chamber 40. The slot 8 permits the mold 48 to be introduced into the cylindrical body 4, 6 and to be removed from such body 4, 6. When the mold 48 is introduced into the body 4, 6, it is secured to the chord wall 22 by releasable fastening means carried by such wall 22.

The drawings show the preferred embodiment of the fastening means. (See especially FIG. 8.) The chord wall 22 is provided with a series of longitudinally extending T-slots 24. These slots 24 extend substantially along the entire length of the chord wall 22. The mold 48 is secured in position by means of finger clamps 26. Each clamp 26 is provided with clamping force through an air cylinder 30. The air cylinder 30 engages one end of a pivoting arm 32. The other end of the arm 32 is urged against a surface of the mold 48 opposite the chord wall 22. A pivot mount 28 is provided between the air cylinder 30 and the mold 48. One end of the pivot mount is T-shaped to engage a T-slot 24. The other end of the pivot 28 extends through the arm 32 and is secured thereto by means of a nut 33.

Each air cylinder 30 is provided with pressurized air through an air line 34 that is connected to an air hose coupling 36 in one of the end walls 6. The exterior portion of the coupling 36 is connected to an exterior air line 37, which is in turn attached to a source of pressurized air (not shown). Preferably, the coupling 36 is a swivel coupling to prevent twisting of line 37 when body 4, 6 is rotated.

Each air cylinder 30 has two opposite piston rods extending from its opposite ends. When the cylinder 30 is energized with pressurized air, each of the piston rods is moved outwardly from the cylinder 30. One rod is urged against the chord wall 22, and the other rod is urged against the end of the pivoting arm 32. Movement of the pivoting arm 32 is limited by engagement with the nut 33 on the outer end of the pivot mount 28. The action of the air cylinder 30 on the radially outer end of the arm 32 causes the radially inner end of the arm 32 to be pressed against the mold 48 to in turn urge the mold 48 against the chord wall 22. In a typical installation, a mold 48 would be secured by four finger clamps 26, two on each side of the mold 48. For relatively large molds, the number of finger clamps 26 on each side would be correspondingly increased.

The apparatus 2 is also provided with means for heating the membrane 38 to in turn heat any composite material positioned thereon and for introducing fluid pressure into the chamber 40 to expand the membrane 38 toward the molding surface 49 of the mold 48. The heating and introduction of fluid pressure could be accomplished by introducing a heated pressurized fluid into the chamber 40. However, in the preferred embodiment separate electric heating elements 44 are provided in the chamber 40. The provision of separate heating elements 44 permits the temperature of the membrane 38 to be maintained at a substantially constant level regardless of the fluid pressure in the chamber 40. The heating elements 44 are electrically connected to an electrical connector 46 on an end wall 6 of the body 4, 6. The electrical connector 46 is in turn connected to an electric line 47 leading to a power source. Connector 46 may be a swivel connector, or alternatively line 47 may be sufficiently flexible to accommodate rotation of body 4, 6.

Fluid pressure is introduced into the chamber 40 via a coupling 41 on an end wall 6, one end of which communicates with the chamber 40 and the other end of which is connected to a fluid supply line 42. In the preferred embodiment, the pressurized fluid is pressurized air. The source of the pressurized air for pressurizing the chamber 40 may be the same source that is used for pressurizing the air cylinder 30 or a difference source. Like coupling 36, coupling 41 is preferably a swivel coupling.

The apparatus 2 is preferably also provided with a means for applying a vacuum between the molding surface 49 and the composite material that has been formed against the mold 48. In order to supply the vacuum, an end wall 6 of the body 4, 6 is provided with a vacuum coupling 58 that is connected to an external vacuum line 60. Coupling 58 is preferably a swivel coupling to accommodate rotation of body 4, 6. The inner portion of the coupling 58 is connected to an interior vacuum line 56. The mold 48 is provided with a quick disconnect vacuum coupling 54 to which the inner end of the interior vacuum line 56 may be quickly and easily connected or disconnected. As shown in the drawings, the quick disconnect coupling 54 may be carried by the peripheral flange 50 of the mold 48 which is engaged by the finger clamps 26. In this arrangement, the molding surface 49 would preferably be somewhat porous or have a number of extremely fine passageways extending therethrough in order to apply the vacuum uniformly over the entire extent of the formed composite material.

The parts of the apparatus 2 may be made from a variety of materials. One example of a material suitable for the membrane 38 is a flexible silicone rubber that will not adhere to the material being formed. The mold 38 may be made from any suitable material capable of withstanding cure temperatures and pressures. Such materials include aluminum, steel, and graphite composites. Steel has the advantage of having about the same coefficient of expansion of graphite-epoxy composites.

The preferred embodiment of the method of the invention is illustrated in the drawings. The method includes positioning a mold surface generally above and facing a flexible membrane. In the preferred embodiment, this step includes orienting the cylindrical body 4, 6 into the position shown in FIGS. 1 and 2, if it is not already in such position. Then the mold 48 is introduced into the body 4, 6 through the slot 8. FIG. 1 shows the mold in position to be moved through the slot 8 into the body 4, 6. After the mold 48 has been placed in position on the chord wall 22, the finger clamps 26 are moved into position with the pivoting arms 32 of the clamps 26 positioned to engage the flange 50 of the mold 48. When the mold 48 and clamps 26 are in position, the air cylinders 30 are provided with pressurized air to clamp the mold 48 into place. FIG. 2 shows the mold 48 clamped in position on the chord wall 22 by the clamps 26. After the mold 48 has been clamped in position, the motor 20 is operated to rotate the cylindrical body 4, 6 about its horizontal axis approximately 180°. This rotation of the body 4, 6 completes the step of positioning the mold surface 49 of the mold 48 generally above and facing the flexible membrane 38. FIG. 3 shows the body 4, 6 following the rotation to position the mold surface 49.

The finger clamps 26 are moved into position by sliding each of the clamps 26 along the chord wall 22, with the pivot mount 28 in its T-slot 24, in order to position the clamp 26 longitudinally with respect to the mold 48. As shown in the drawings, the chord wall 22 is provided with a plurality of T-slots 24. This permits the clamps 26 to be positioned radially by engaging the pivot mount 28 in different T-slots 24 in order to accommodate molds of different widths. This radial, as opposed to longitudinal, positioning of the clamps 26 would usually be done before the introduction of the mold 48 into the body 4, 6.

The method also incudes heating the membrane 38 to a forming temperature at which the matrix material of the composite material 70 being formed will flow into the desired shape. The forming temperature is, of course, below the critical cure temperature of the matrix material. The critical cure temperature is the temperature at or above which the matrix material begins to cure and irreversibly loses its capacity to flow in the manner necessary to accomplish flow forming of the composite material. The forming and critical cure temperatures are determined by the characteristics of the matrix material of the particular composite material being formed. One example is a forming temperature of 150° F. for an epoxy resin matrix that cures at 250° to 350° F.

In the preferred embodiment of the method of the invention, the membrane 38 is heated to the forming temperature before the introduction of the composite material 70 to be formed into the apparatus of the invention. Once it has been heated, the membrane 38 is maintained essentially at the forming temperature throughout the process of forming an initial piece of composite material 70 and subsequent pieces of composite material. This helps to maximize the efficiency of the forming of a number of finished articles. The heating of the membrane 38 and the maintenance of the forming temperature is accomplished by means of the heating elements 44 located in chamber 40.

With the mold surface 49 in position above the membrane 38 as shown in FIG. 3, the composite material 70 is laid on the membrane 38. FIG. 3 illustrates the introduction of the composite material 70 into the body 4, 6 through the slot 8. The material 70 slides easily through the slot 8 and onto the membrane 38. The positioning of the material 70 on the membrane 38 is guided in a known manner by indexing lights built into the chord wall 22, to correctly align the material 70 with the mold 48. The matrix material of the composite material 70 that has been laid on the membrane 38 is allowed to be heated evenly by contact with the membrane 38. FIG. 4 shows the material 70 in place on the membrane 38 and being heated by contact with the membrane 38.

When the material 70 has been heated to the forming temperature, fluid pressure, preferably in the form of pressurized air, is applied to the heated membrane 38 opposite the mold surface 49 of mold 48. The pressurized air is supplied through air supply line 42 and coupling 41 into the enclosed chamber 40. The fluid pressure of the pressurized air forces the membrane 38 and the composite material 70 positioned thereon upwardly against the mold surface 49 of the mold 48. This step is illustrated in FIG. 5, which shows the membrane 38 and material 70 substantially completely formed around the mold surface 49.

The fluid pressure in chamber 40 is maintained for a period of time sufficient to allow the matrix of the composite material 70 to flow and the composite material 70 to take the desired shape. This generally takes in the order of a few minutes, with the exact time required depending on the particular composite material being formed and the particular forming temperature chosen. Preferably, after the matrix has flowed and the composite material 70 has taken the desired shape and before the fluid pressure is removed, a vacuum is applied between the composite material 70 and the mold surface 49 to remove any entrapped air or other gases and to ensure that the composite material 70 is completely formed. In the preferred embodiment of the method, while the fluid pressure is being maintained, the body 4, 6 of the apparatus 2 is rotated about its horizontal axis approximately 180° to rotate the mold surface 49 and membrane 38 about 180°. The resulting relative positions of the mold 48 and membrane 38 are shown in FIG. 6. The mold surface 49 is now generally below and facing the membrane 38.

Following rotation of the body 4, 6 from the position shown in FIG. 5 to the position shown in FIG. 6, the fluid pressure is removed from the membrane 38 to allow the membrane 38 to move out of contact with the formed composite material. FIG. 6 shows the membrane 38 moved most of the way out of contact with the material. Once the membrane 38 has moved all the way out of contact with the formed material, the mold 48 and material formed thereon can be moved out of the apparatus 2. This is accomplished by disengaging the clamps 26 and simply sliding the mold 48 with the material thereon out of the body 4, 6 through the slot 8. After being removed from the body 4, 6, the mold 48 and material thereon may be bagged and placed into an autoclave for curing. This frees the apparatus 2 for the forming of another composite material article.

The forming of the second and subsequent articles is carried out in the same manner as the forming of the first article. As each article is formed and removed from the body 4, 6, it may be bagged and placed into the autoclave for curing. Many installations include very large autoclaves which accommodate a number of articles to be cured. Forming the articles in the apparatus of the invention and then placing them into an autoclave for curing is the most efficient way of carrying out the fabrication of the articles. The forming process is relatively short compared to the much longer curing process. Therefore, a single relatively inexpensive unit of forming apparatus may be used to form articles in a series of batches of a single or a small number of articles, and a number of batches of formed articles may be simultaneously cured in a large autoclave. This arrangement makes very efficient use of equipment and operator time.

The size of the cylindrical body 4,6 may be varied to meet the needs of particular installations. The body 4, 6 may be quite long to provide for the forming of a single long article or a plurality of smaller articles. In the latter case, the smaller articles would of course preferably be formed simultaneously. In installations in which only relatively small articles are to be formed and there are space and/or equipment cost limitations, a shorter body 4, 6 would be preferable.

FIG. 7 shows the mold 48 and a formed and cured article 72. The article 72 is separated from the mold 48 only after completion of the curing process and removal of the mold 48 from the autoclave. The article 72 shown in FIG. 7 is finished except for the usual trimming of its edges. As noted above, the article 72 shown in FIG. 7, with its center recess 74 and rounded edges, is only one example of a composite material article which may be formed quickly and easily by use of the method and apparatus of the present invention but which would be unreasonably costly to produce by use of conventional methods.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A method of forming into a desired shape composite material that includes a matrix material which is reinforced with a fibrous material and which has a critical cure temperature, comprising:
   positioning a mold surface generally above and spaced from and facing a flexible membrane;
   heating the membrane to a forming temperature at which the matrix material will flow into the desired shape and which is below the critical cure temperature of the matrix material;
   laying the composite material on the membrane, and allowing the matrix material to be heated evenly by contact with the membrane;
   when the matrix material has been heated to said forming temperature, applying fluid pressure to the heated membrane opposite the mold surface to force the membrane and the material thereon to move upwardly into contact with and against the mold surface;
   while maintaining the fluid pressure, allowing the matrix material to flow and the composite material to take the desired shape; and
   then removing the fluid pressure from the membrane to allow the membrane to move out of contact with the composite material.

2. A method of forming into a desired shape composite material that includes a matrix material which is reinforced with a fibrous material and which has a critical cure temperature, comprising:
   positioning a mold surface generally above and spaced from and facing a flexible membrane;
   heating the membrane to a forming temperature at which the matrix material will flow into the desired shape and which is below the critical cure temperature of the matrix material;
   laying the composite material on the membrane, and allowing the matrix material to be heated evenly by contact with the membrane;
   when the matrix material has been heated to said forming temperature, applying fluid pressure to the heated membrane opposite the mold surface to force the membrane and the material thereon to move upwardly into contact with and against the mold surface;
   while maintaining the fluid pressure, allowing the matrix material to flow and the composite material to take the desired shape and rotating the mold surface and membrane about a horizontal axis about 180°; and
   then removing the fluid pressure from the membrane to allow the membrane to move out of contact with the composite material.

3. A method as recited in claim 2, further comprising, after allowing the matrix material to flow and before removing the fluid pressure, applying a vacuum between the composite material and the mold surface to ensure that the composite material is completely formed.

4. A method as recited in claim 2, further comprising, after allowing the membrane to move out of contact, moving the mold surface and the composite material formed thereon away from the membrane and into an autoclave, and curing the composite material in said autoclave.

5. A method of forming into a desired shape composite material that includes a matrix material which is reinforced with a fibrous material and which has a critical cure temperature, comprising:

positioning a mold surface generally above and facing a flexible membrane;

heating the membrane to a forming temperature at which the matrix material will flow into the desired shape and which is below the critical cure temperature of the matrix material;

laying the composite material on the membrane, and allowing the matrix material to be heated evenly by contact with the membrane;

applying fluid pressure to the heated membrane opposite the mold surface to force the membrane and the material thereon upwardly against the mold surface;

while maintaining the fluid pressure, allowing the matrix material to flow and the composite material to take the desired shape and rotating the mold surface and membrane about a horizontal axis about 180°;

then removing the fluid pressure from the membrane to allow the membrane to move out of contact with the composite material; and after allowing the membrane to move out of contact:

moving the mold surface and the composite material formed thereon away from the membrane;

positioning a second mold surface generally below and facing the membrane;

rotating the second mold surface and the membrane about said axis about 180° to position the second mold surface generally above and facing the membrane;

laying unformed composite material on the membrane, and allowing said unformed material to be heated evenly by contact with the membrane; and repeating the steps of applying, maintaining, and then removing fluid pressure to form said unformed composite material.

6. A method as recited in claim 5, comprising, following heating the membrane to said forming temperature, maintaining the membrane essentially at said forming temperature at least through the step of repeating the steps of applying and maintaining fluid pressure.

7. A method as recited in claim 5, further comprising, after moving the first mold surface and the composite material formed thereon away from the membrane, placing said first mold surface and composite material formed thereon inside an autoclave, and curing said composite material formed thereon in said autoclave.

* * * * *